United States Patent
Kim et al.

(10) Patent No.: US 11,492,951 B2
(45) Date of Patent: Nov. 8, 2022

(54) EGR EFFECTIVE FLOW DIAGNOSIS METHOD

(71) Applicants: HYUNDAI MOTOR COMPANY, Seoul (KR); KIA MOTORS CORPORATION, Seoul (KR)

(72) Inventors: Dong-Sun Kim, Seoul (KR); Da-Som Ahn, Suwon-si (KR); Young-Rak Choi, Suwon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 386 days.

(21) Appl. No.: 16/824,277

(22) Filed: Mar. 19, 2020

(65) Prior Publication Data

US 2021/0164381 A1 Jun. 3, 2021

(30) Foreign Application Priority Data

Dec. 3, 2019 (KR) .................. 10-2019-0159201

(51) Int. Cl.
| | |
|---|---|
| *F01N 11/00* | (2006.01) |
| *F02M 26/47* | (2016.01) |
| *F02M 26/48* | (2016.01) |
| *F02M 26/49* | (2016.01) |
| *F02M 26/06* | (2016.01) |
| *F02D 41/00* | (2006.01) |

(52) U.S. Cl.
CPC ........ *F01N 11/005* (2013.01); *F02D 41/0062* (2013.01); *F02D 41/0077* (2013.01); *F02M 26/06* (2016.02); *F02M 26/47* (2016.02); *F02M 26/48* (2016.02); *F02M 26/49* (2016.02); *F02D 41/0055* (2013.01); *F02D 41/0072* (2013.01)

(58) Field of Classification Search
CPC .............. F01N 11/005; F02D 41/0062; F02D 41/0077; F02D 41/0055; F02D 41/0072; F02M 26/06; F02M 26/47; F02M 26/48; F02M 26/49
See application file for complete search history.

(56) References Cited

U.S. PATENT DOCUMENTS

| | | | | |
|---|---|---|---|---|
| 5,546,915 A | * | 8/1996 | Isobe | F02M 26/33 123/568.21 |
| 2014/0372010 A1 | * | 12/2014 | Han | F02M 26/49 701/108 |

FOREIGN PATENT DOCUMENTS

KR 20180076152 A 7/2018

* cited by examiner

*Primary Examiner* — Mickey H France
(74) *Attorney, Agent, or Firm* — Lempia Summerfield Katz LLC

(57) ABSTRACT

An Exhaust Gas Recirculation (EGR) effective flow diagnosis method includes: measuring an EGR gas temperature by an EGR gas temperature sensor under an EGR gas temperature rise condition of an EGR system on an intake line; determining the degree of the EGR gas temperature rise; and determining whether an EGR effective flow is excessive or insufficient according to the degree of the EGR gas temperature rise.

18 Claims, 5 Drawing Sheets

EGR EFFECTIVE FLOW DIAGNOSIS METHOD

CROSS-REFERENCE TO RELATED APPLICATION

This application claims priority to Korean Patent Application No. 10-2019-0159201, filed on Dec. 3, 2019, which is incorporated herein by reference in its entirety.

BACKGROUND OF THE DISCLOSURE

Field of the Disclosure

The present disclosure relates to a method of diagnosing the presence and absence of an effective flow by opening and closing Exhaust Gas Recirculation (EGR).

Description of Related Art

Recently, Exhaust Gas Recirculation (EGR) has been developed and applied to enhance fuel efficiency of a vehicle engine.

An EGR system refers to a method of reducing Nitrogen Oxide (NOx) in an exhaust gas and refers to an apparatus or a system for recirculating a portion of the inert exhaust gas into a suction system. An EGR system mixes the inert exhaust gas into a mixed gas sucked into an engine to decrease the highest temperature during the combustion to generate less NOx.

Further, in order to secure operability, the EGR system senses the intake temperature, the coolant temperature, the vehicle speed, or the gear shift position to control and to recirculate a portion of the exhaust gas into a suction pipe under the most suitable control according to an operating state.

In other words, as illustrated in FIG. 1, the EGR system is a system configured to acquire the exhaust gas exhausted from a cylinder at the rear end of a catalyst to deliver it to the front end of a compressor. The EGR system controls whether to recirculate the exhaust gas by an EGR valve provided on an EGR passage.

In this example, in order to determine whether the EGR system operates normally, it is necessary to diagnose whether an EGR effective flow is present when the EGR valve is closed (opening diagnosis) or to diagnose whether there is no EGR effective flow when the EGR valve is open (clogging diagnosis).

Conventionally, it has been diagnosed that the EGR system is clogged or fully opened by determining an EGR effective flow (kg/h) as a difference between the effective flow (kg/h) calculated by a Manifold Absolute Pressure sensor (MAP sensor) and the effective flow (kg/h) calculated by a Mass Air Flow sensor (MAF sensor). A MAP sensor is provided between a cylinder and a throttle valve. The MAF sensor is provided at the front end of the compressor. The EGR effective flow is compared with a model effective flow calculated by an EGR valve model to determine that the EGR effective flow is insufficiently supplied or excessively supplied.

However, such a method has been unreasonable in practical applications due to determining that there is nothing, even if there is the EGR effective flow, or vice versa. This is because there is a large error between the effective flow calculated by the MAP sensor and the effective flow calculated by the MAF sensor.

The contents described in the Description of Related Art section are to help in understanding the background of the present disclosure and may include what is not previously known to a person of ordinary skill in the art to which the present disclosure pertains.

SUMMARY OF THE DISCLOSURE

The present disclosure is intended to solve the above-described problem. An object of the present disclosure is to provide an Exhaust Gas Recirculation (EGR) effective flow diagnosis method capable of accurately performing opening diagnosis or clogging diagnosis even when an EGR valve or a cooler is abnormal.

An EGR effective flow diagnosis method according to one aspect of the present disclosure includes: checking an EGR differential pressure by an EGR pressure sensor on an intake line; measuring an EGR gas temperature by an EGR gas temperature sensor if the EGR differential pressure exceeds a reference differential pressure; and calculating an EGR effective flow according to an EGR gas temperature rise. The EGR gas temperature rise is measured by the measuring the EGR gas temperature, calculating the relationship between the EGR effective flow and an EGR valve position, and calculating an EGR effective flow at the EGR valve 0% position and an EGR effective flow at the EGR valve 100% position from the relationship between the EGR effective flow and the EGR valve position.

Further, the measuring of the EGR gas temperature may include measuring in a state where an EGR valve has been closed or in a state where it has been opened. The measuring of the EGR gas temperature may further include, before or after the calculating of the relationship between the EGR effective flow and the EGR valve position, determining whether the measurement by the measuring of the EGR gas temperature has exceeded a closed reference count in a state where the EGR valve has been closed and whether it has exceeded an open reference count in a state where the EGR valve has been open.

Furthermore, if the measurement by the measuring of the EGR gas temperature does not exceed the closed reference count in the state where the EGR valve has been closed or does not exceed the open reference count in the state where the EGR valve has been open, the checking of the EGR differential pressure may be performed.

In this example, the measuring of the EGR gas temperature may be repeatedly performed by changing the EGR valve position.

The EGR effective flow diagnosis method may further include confirming whether the EGR effective flow at the EGR valve 100% position is less than a No Flow Threshold. If the EGR effective flow at the EGR valve 100% position is less than the No Flow Threshold, the EGR effective flow is diagnosed as EGR clogging.

Alternatively, the EGR effective flow diagnosis method may further include confirming whether the EGR effective flow at the EGR valve 0% position exceeds a Max Flow Threshold. If the EGR effective flow at the EGR valve 0% position exceeds the Max Flow Threshold, the EGR effective flow is diagnosed as EGR opening.

Further, after the measuring of the EGR gas temperature, the degree of the EGR gas temperature rise may be normalized to exhaust energy.

An EGR effective flow diagnosis method according to another aspect of the present disclosure includes: checking whether the exhaust pressure of an exhaust gas rises; measuring an EGR gas temperature by an EGR gas temperature sensor if the exhaust pressure rise exceeds a predetermined reference value; calculating an EGR effective flow according to the EGR gas temperature rise; calculating the relationship between the EGR effective flow and an EGR valve position; and calculating an EGR effective flow at the EGR valve 0% position and an EGR effective flow at the EGR valve 100% position from the relationship between the EGR effective flow and the EGR valve position.

Further, the measuring of the EGR gas temperature may include, in a state where an EGR valve has been closed or in a state where it has been open, and after the calculating of the relationship between the EGR effective flow and the EGR valve position, determining whether the measurement by the measuring of the EGR gas temperature has exceeded a closed reference count in a state where the EGR valve has been closed and whether it has exceeded an open reference count in a state where the EGR valve has been open.

Furthermore, the checking of the EGR differential pressure may be performed if the measurement by the measuring of the EGR gas temperature does not exceed the closed reference count in the state where the EGR valve has been closed or does not exceed the open reference count in the state where the EGR valve has been open.

The EGR effective flow diagnosis method may further include confirming whether the EGR effective flow at the EGR valve 100% position is less than a No Flow Threshold. If the EGR effective flow at the EGR valve 100% position is less than the No Flow Threshold, EGR effective flow is diagnosed as EGR clogging.

Further, the EGR effective flow diagnosis method may further include confirming whether the EGR effective flow at the EGR valve 0% position exceeds a Max Flow Threshold. If the EGR effective flow at the EGR valve 0% position exceeds the Max Flow Threshold, EGR effective flow is diagnosed as EGR opening.

An EGR effective flow diagnosis method according to still another aspect of the present disclosure includes: checking whether an engine load rises; measuring an EGR gas temperature by an EGR gas temperature sensor if the engine load exceeds a predetermined reference value; calculating an EGR effective flow according to an EGR gas temperature rise; calculating the relationship between the EGR effective flow and an EGR valve position; and calculating an EGR effective flow at the EGR valve 0% position and an EGR effective flow at the EGR valve 100% position from the relationship between the EGR effective flow and the EGR valve position.

Further, the measuring of the EGR gas temperature may include measuring in a state where an EGR valve has been closed or in a state where it has been open. After the calculating of the relationship between the EGR effective flow and the EGR valve position, the measuring of the EGR gas temperature may further include determining whether the measurement has exceeded a closed reference count in a state where the EGR valve has been closed and whether it has exceeded an open reference count in a state where the EGR valve has been open.

Further, if the measurement by the measuring of the EGR gas temperature does not exceed the closed reference count in the state where the EGR valve has been closed or does not exceed the open reference count in the state where the EGR valve has been open, the checking of the EGR differential pressure may be performed.

The EGR effective flow diagnosis method may further include confirming whether the EGR effective flow at the EGR valve 100% position is less than a No Flow Threshold. If the EGR effective flow at the EGR valve 100% position is less than the No Flow Threshold, EGR effective flow is diagnosed as EGR clogging.

Alternatively, the EGR effective flow diagnosis method further includes confirming whether the EGR effective flow at the EGR valve 0% position exceeds a Max Flow Threshold. If the EGR effective flow at the EGR valve 0% position exceeds the Max Flow Threshold, EGR effective flow is diagnosed as EGR opening.

If the EGR valve, the cooler, or the like is clogged, the EGR gas does not flow even when the EGR valve is opened. At this time, since the EGR gas temperature does not increase or increases slowly, it may be seen that the EGR is clogged through the above.

Further, if the EGR valve, the cooler, or the like is structurally open, a large amount of EGR gas may flow even when the EGR valve is supposed to be closed. At this time, since the EGR valve stays in a state where the EGR gas temperature has been increased, it may be seen that the EGR is open through the above.

As described above, it is possible to diagnose the EGR clogging/opening without error by using the change amount and the change rate of the EGR gas temperature measured by the EGR gas temperature sensor.

Therefore, there is no possibility of misdiagnosis due to errors of the MAF and MAP sensors.

Therefore, it is possible to improve the accuracy of the EGR effective flow diagnosis, thereby maintaining the fuel efficiency enhancement effect by the EGR system.

DESCRIPTION OF SPECIFIC EMBODIMENTS

In order to fully understand the present disclosure, the operational advantages of the present disclosure, and the objects achieved by the practice of the present disclosure, reference should be made to the accompanying drawings which illustrate various embodiments of the present disclosure and the contents described in the accompanying drawings.

In describing the embodiments of the present disclosure, well-known techniques or repeated descriptions that may unnecessarily obscure the subject matter of the present disclosure are shortened or omitted.

Figure 1:
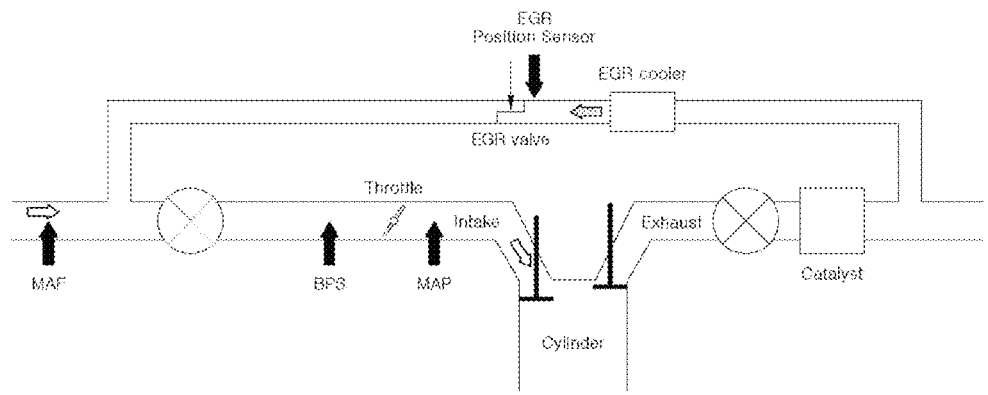
FIG. 1 is a diagram illustrating a conventional Exhaust Gas Recirculation (EGR) system.
Figure 2:
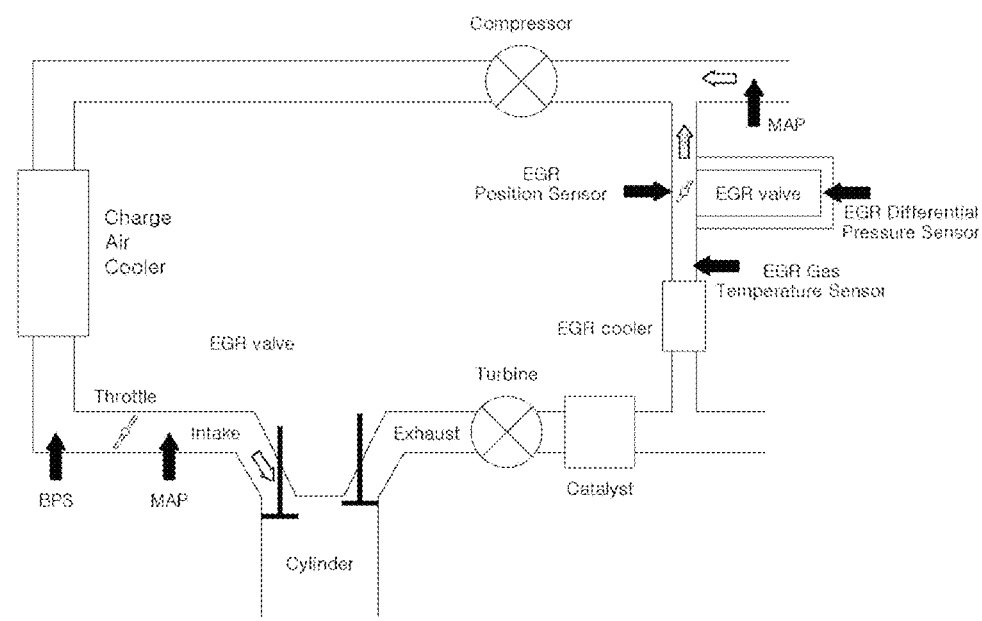
FIG. 2 is a diagram illustrating an EGR system to which the present disclosure is applied.
Figure 3:
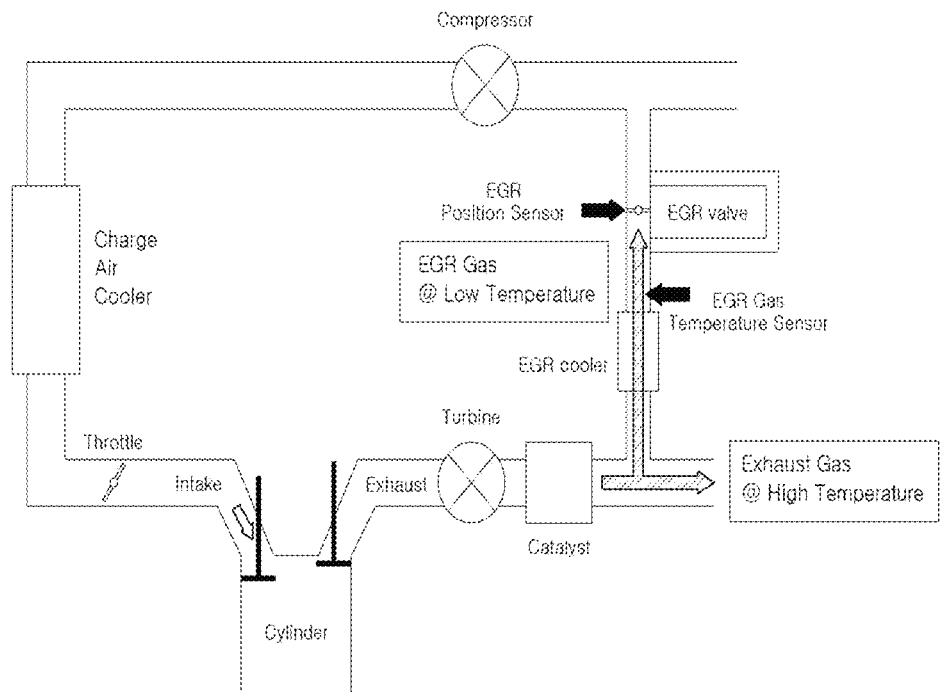
FIG. 3 is a diagram illustrating a state where an EGR valve has been clogged in the system shown in FIG. 2.

FIG. 2 is a diagram illustrating an Exhaust Gas Recirculation (EGR) system to which the present disclosure is applied. FIG. 3 is a diagram illustrating a state where an EGR valve has been clogged in the system shown in FIG. 2.

Figure 4:
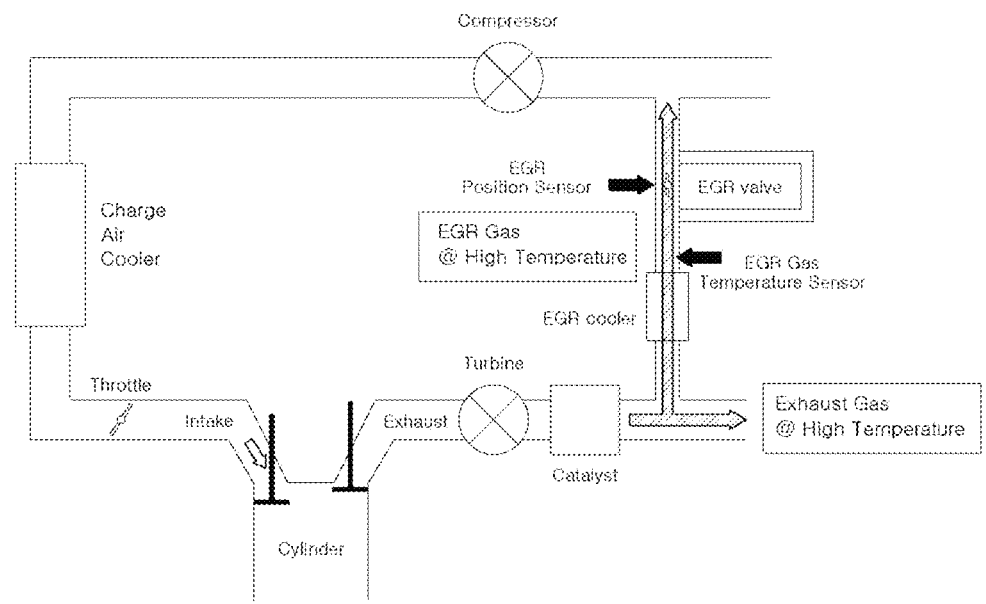
FIG. 4 is a diagram illustrating a state where the EGR valve has been opened in the system shown in FIG. 2.

FIG. 4 is a diagram illustrating a state where the EGR valve has been opened in the system shown in FIG. 2.

An EGR effective flow diagnosis method according to the present disclosure is configured for preventing an EGR effective flow from being misidentified due to the fault of an EGR system such as an EGR valve or a cooler.

If the EGR valve, the cooler, or the like is clogged as shown in FIG. 3, the EGR gas does not flow even when the EGR valve is opened. At this time, since an EGR gas temperature does not increase or increases slowly, it is possible to know whether the EGR has been clogged according to whether the EGR gas temperature has increased.

Further, if the EGR valve, the cooler, or the like is structurally open as shown in FIG. 4, a large amount of EGR gas flows even when the EGR valve is supposed to be closed. At this time, it stays in a state where the EGR gas temperature has been increased. Therefore, it is possible to know whether the EGR has been open according to whether the EGR gas temperature has been increased.

In other words, the present disclosure may diagnose the EGR clogging/opening by using the change amount and the change rate of the EGR gas temperature measured by the EGR gas temperature sensor.

Figure 5:
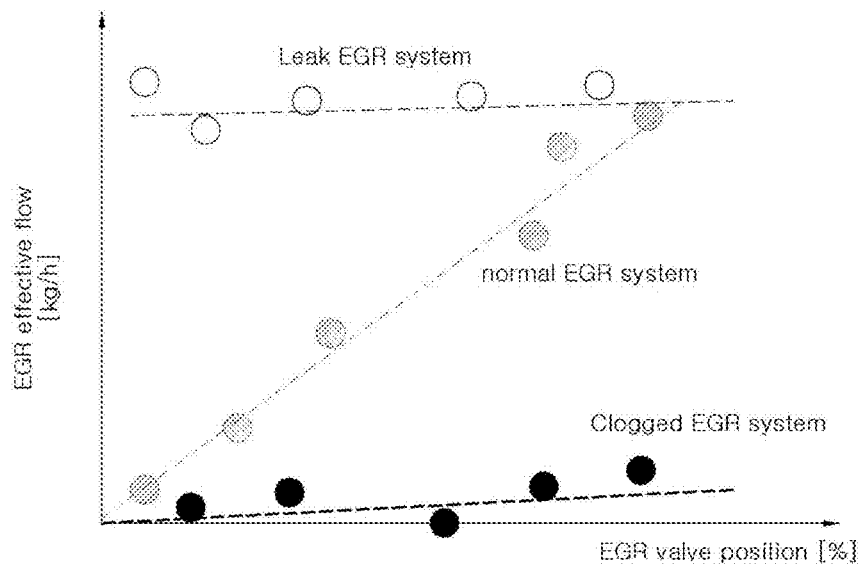
FIG. 5 is a diagram illustrating the relationship between an EGR valve position and an EGR effective flow according to normal/abnormal states.

Referring to FIG. 5, if the EGR valve is normal, the EGR effective flow is generally proportional according to the position of the EGR valve.

However, if the EGR valve is clogged, the EGR effective flow remains low and does not change even if the EGR valve position is changed.

On the contrary, if a leak, or the like occurs in the EGR valve, the EGR effective flow remains high and does not change even if the position of the EGR valve changes.

Figure 6A:
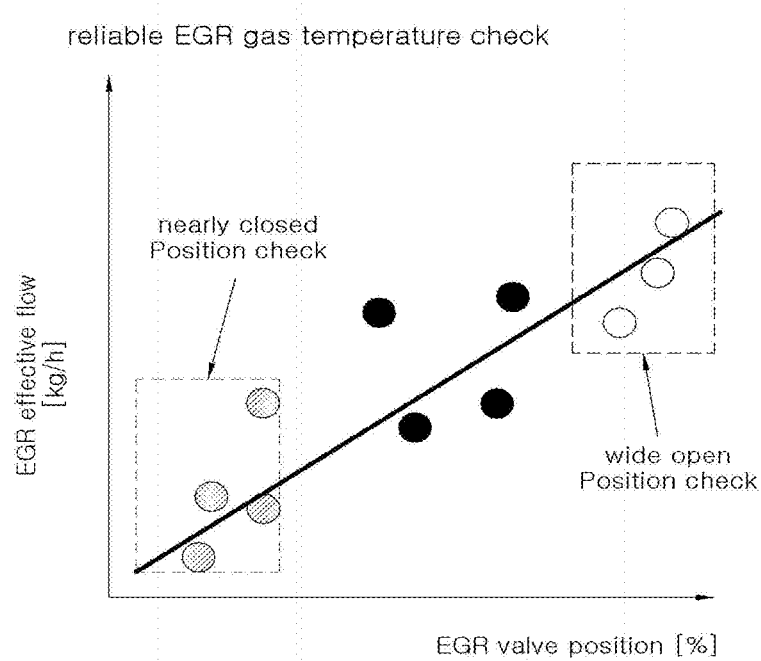
FIGS. 6A and 6B are diagrams illustrating the relationship between the EGR valve position and the EGR effective flow by checking an EGR gas temperature.
Figure 6B:
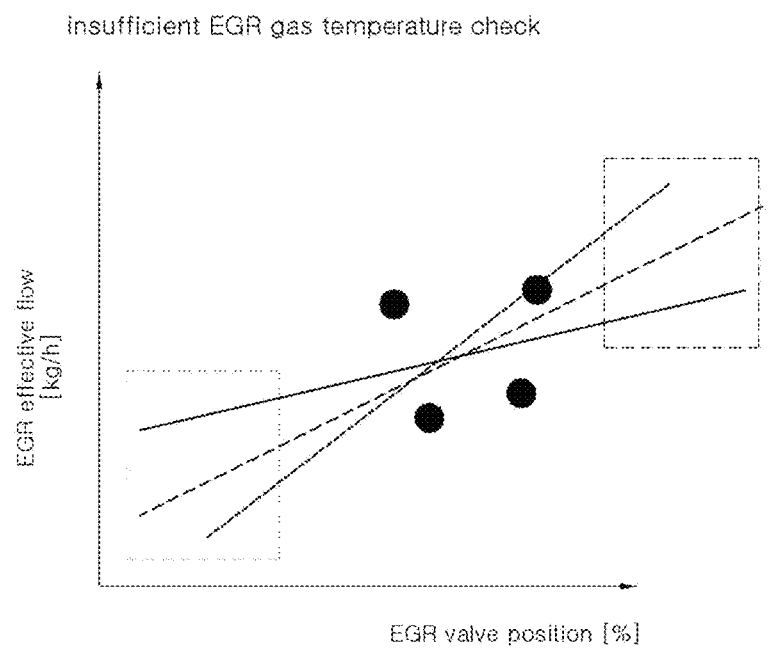

Next, FIGS. 6A and 6B are diagrams illustrating the relationship between the EGR valve and the EGR effective flow by the EGR gas temperature check.

Although it is described below, the EGR method described in the present disclosure calculates the EGR effective flow using the degree of the EGR gas temperature rise, repeatedly performs the calculation to derive its relationship as a regression line, and compares the EGR effective flow when the EGR valve is in a closed position and the EGR effective flow when the EGR valve is in an open position with a reference value by the regression line. Thereby, the clogging or the opening of the EGR valve may be diagnosed.

Therefore, when checking the EGR effective flow according to the EGR gas temperature by a predetermined number of times as in FIG. 6A, it is possible to derive a reasonable regression line. If the number of times checking the EGR effective flow is insufficient as shown in FIG. 6B, it is not possible to derive the regression line.

Figure 7:
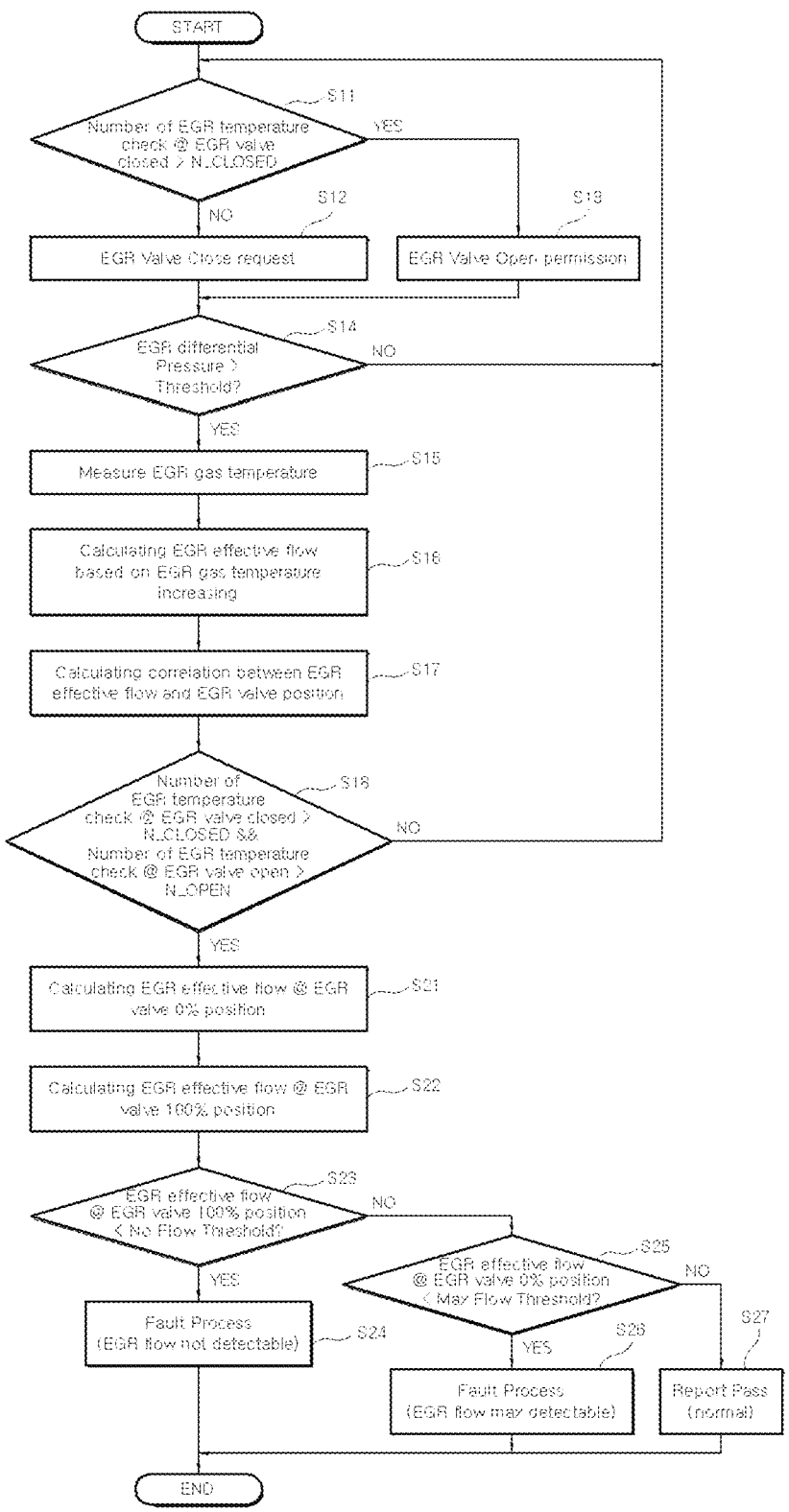
FIG. 7 is a flowchart sequentially illustrating an EGR effective flow diagnosis method according to the present disclosure.

FIG. 7 is a flowchart sequentially illustrating an EGR effective flow diagnosis method according to the present disclosure. The EGR effective flow diagnosis method according to the present disclosure is described below in more detail with reference to FIG. 7.

First, an EGR gas temperature is checked (S11) when the EGR valve is closed. In this operation, it is determined whether the number of EGR gas temperature checks has exceeded a closed reference count (N_CLOSED).

Therefore, if the number of EGR gas temperature checks has exceeded the closed reference count, the EGR valve is closed (S12), and if it has not exceeded the closed reference count, the EGR valve is open (S13).

After the control of the S12 and the S13, an EGR differential pressure is checked (S14) to determine whether the EGR differential pressure has exceeded a reference differential pressure. The differential pressure is measured by a differential pressure sensor provided on an intake line of the engine.

The method described in the present disclosure diagnoses the clogging/opening of the EGR system according to the degree of the EGR gas temperature rise. The excess of the reference differential pressure of the EGR differential pressure corresponds to a control entry condition corresponding to a condition where the EGR gas temperature rise is expected.

In addition to the above, the control entry condition of the present disclosure may be determined by a vehicle accelerating or by an increased engine load.

As the determination result of step S14, if the EGR differential pressure exceeds the reference differential pressure, the EGR gas temperature is measured (S15) to calculate the degree of the EGR gas temperature rise. The EGR gas temperature is measured by the EGR gas temperature sensor.

Then, the degree of the EGR gas temperature rise is normalized to exhaust energy to remove external effects other than the EGR effective flow.

In other words, the degree of the temperature rise is divided by the differential pressure accumulation or the degree of the temperature rise is corrected to a value corresponding to the exhaust energy so that the engine temperature rise, the coolant temperature rise, or the engine room temperature rise are removed.

Next, after measuring the EGR gas temperature (S15), the EGR effective flow according to the EGR gas temperature rise is calculated (S16), and the relationship between the EGR effective flow and the EGR valve position is calculated (S17).

This process is repeatedly performed several times by determining (S18) whether the number of EGR gas temperature checks has been exceeded for each opening and closing of the EGR valve. The steps S14-S17 are repeatedly performed until the predetermined number of times is exceeded.

In other words, in step S18, it is determined whether the number of EGR gas temperature checks has exceeded the closed reference count (N_CLOSED) in a state where the EGR valve has been closed, and whether the number of EGR gas temperature checks has exceeded an opened reference count (N_OPEN) in a state where the EGR valve has been opened. If the number of EGR gas temperature checks has not exceeded the reference counts N_CLOSED and the N_OPEN, the EGR valve position is changed so that the EGR gas temperature is measured several times in the S15.

As a result, in this example, the relationship between the EGR effective flow and the EGR valve position calculated according to the EGR gas temperature is calculated and the result may be represented by a regression line as shown in FIG. 6A.

Therefore, if the number of EGR gas temperature measurements exceeds the closed reference count and the opened reference count in step S18, an EGR effective flow at the EGR valve 0% position (S21) and an EGR effective flow at the EGR valve 100% position (S22) are calculated sequentially through the relationship between the EGR effective flow and the EGR valve position derived in step S17 (the regression line shown in FIG. 6A). In this example, the order of the calculations in steps S21 and S22 is irrelevant.

Using the calculation result of step S22, it is confirmed whether the EGR effective flow at the EGR valve 100% position is less than a No Flow Threshold (S23). In this case, the EGR flow is not detectable and an EGR clogging is diagnosed (S24).

Further, using the calculation result of step S21, it is confirmed whether the EGR effective flow at the EGR valve 0% position exceeds a Max Flow Threshold (S25). In this case, the EGR flow max is detectable and an EGR opening (S26) is diagnosed. Otherwise, if the EGR effective flow at the EGR valve 0% position does not exceed the Max Flow Threshold, a pass is reported (S27).

As described above, unlike the conventional method, the EGR effective flow diagnosis method according to the present disclosure may diagnose the EGR system more accurately by determining the clogging abnormality or the opening abnormality of the EGR valve by the degree of the EGR gas temperature rise.

In an embodiment, the EGR system may include an electronic control unit (ECU). The ECU may be or include a microprocessor or other computer hardware device capable of being programmed with software, firmware or otherwise. The ECU meets standard specifications for use and operation in vehicles.

The ECU may be an application-specific integrated circuit ("ASIC"), digital signal processor, field programmable gate array ("FPGA"), digital circuit, analog circuit, general processor, or combinations thereof. In one example, the processor is one or more processors operable to control and/or communicate with the various electronics and logic of the associated components or devices.

The ECU may run an EGR effective flow diagnosis program including computer-executable instructions implemented in software or firmware. The ECU may execute the program instructions to carry out the functions of the EGR system, as explained herein.

Although the present disclosure described above has been described with reference to the drawings, it is not limited to the described embodiments. It should be apparent to a person of ordinary skill in the art that various changes and modifications may be made without departing from the spirit and scope of the present disclosure. Therefore, such changed examples or modified examples may belong to the claims of the present disclosure, and the scope of the present disclosure should be construed based on the appended claims.

What is claimed is:

1. An Exhaust Gas Recirculation (EGR) effective flow diagnosis method, the method comprising:
   measuring an EGR gas temperature by an EGR gas temperature sensor under an EGR gas temperature rise condition of an EGR system on an intake line;
   determining, by a processor, a degree of the EGR gas temperature rise; and
   determining, by the processor, whether an EGR effective flow is excessive or insufficient according to the degree of the EGR gas temperature rise,
   wherein the measuring of the EGR gas temperature includes measuring the EGR gas temperature when an EGR valve of the EGR system has been closed and when the EGR valve has been open, respectively.

2. The method of claim 1, wherein, before or after the measuring of the EGR gas temperature, determining whether to satisfy a gas temperature measurement reference.

3. The method of claim 1, wherein the processor is a part of an engine control unit (ECU) of an engine associated with the intake line.

4. An Exhaust Gas Recirculation (EGR) effective flow diagnosis method, the method comprising:
   measuring an EGR gas temperature by an EGR gas temperature sensor under an EGR gas temperature rise condition of an EGR system on an intake line;
   determining, by a processor, a degree of the EGR gas temperature rise; and
   determining, by the processor, whether an EGR effective flow is excessive or insufficient according to the degree of the EGR gas temperature rise,
   wherein, before or after the measuring of the EGR gas temperature, determining whether to satisfy a gas temperature measurement reference, and
   wherein the determining of whether to satisfy the gas temperature measurement reference includes determining whether the measurement by the measuring of the EGR gas temperature has exceeded a closed reference count in a state where an EGR valve of the EGR system has been closed and/or whether the measurement has exceeded an open reference count in a state where the EGR valve has been open.

5. An Exhaust Gas Recirculation (EGR) effective flow diagnosis method, the method comprising:
   measuring an EGR gas temperature by an EGR gas temperature sensor under an EGR gas temperature rise condition of an EGR system on an intake line;
   determining, by a processor, a degree of the EGR gas temperature rise;
   determining, by the processor, whether an EGR effective flow is excessive or insufficient according to the degree of the EGR gas temperature rise;
   calculating, by the processor, the EGR effective flow according to the degree of the EGR gas temperature rise;
   calculating, by the processor, a relationship between the EGR effective flow and an EGR valve position; and
   calculating the EGR effective flow at a 0% position of the EGR valve and an EGR effective flow at a 100% position of the EGR valve from the relationship between the EGR effective flow and the EGR valve position.

6. The method of claim 5,
   wherein the measuring of the EGR gas temperature is repeatedly performed by changing the EGR valve position.

7. The method of claim 5, further comprising confirming whether the EGR effective flow at the EGR valve 100% position is less than a No Flow Threshold,
   wherein, if the EGR effective flow at the EGR valve 100% position is less than the No Flow Threshold, the EGR effective flow is diagnosed as EGR clogging.

8. The method of claim 5, further comprising confirming whether the EGR effective flow at the EGR valve 0% position exceeds a Max Flow Threshold,
   wherein, if the EGR effective flow at the EGR valve 0% position exceeds the Max Flow Threshold, the EGR effective flow is diagnosed as EGR opening.

9. The method of claim 5,
   wherein, after the measuring of the EGR gas temperature, the degree of the EGR gas temperature rise is normalized to exhaust energy.

10. The method of claim 5,
    wherein the EGR gas temperature rise condition is a case where an EGR differential pressure exceeds a reference differential pressure by checking the EGR differential pressure.

11. The method of claim 10, further comprising confirming whether the EGR effective flow at the EGR valve 100% position is less than a No Flow Threshold, wherein, if the EGR effective flow at the EGR valve 100% position is less than the No Flow Threshold, the EGR effective flow is diagnosed as EGR clogging.

12. The method of claim 10, further comprising confirming whether the EGR effective flow at the EGR valve 0% position exceeds a Max Flow Threshold, wherein, if the EGR effective flow at the EGR valve 0% position exceeds the Max Flow Threshold, the EGR effective flow is diagnosed as an EGR opening.

13. The method of claim 5, wherein the EGR gas temperature rise condition is a case where an exhaust pressure exceeds a predetermined reference by checking whether the exhaust pressure of an exhaust gas rises.

14. The method of claim 13, further comprising confirming whether the EGR effective flow at the EGR valve 100% position is less than a No Flow Threshold, wherein, if the EGR effective flow at the EGR valve 100% position is less than the No Flow Threshold, the EGR effective flow is diagnosed as EGR clogging.

15. The method of claim 13, further comprising confirming whether the EGR effective flow at the EGR valve 0% position exceeds a Max Flow Threshold, wherein, if the EGR effective flow at the EGR valve 0% position exceeds the Max Flow Threshold, the EGR effective flow is diagnosed as EGR opening.

16. The method of claim 5, wherein the EGR gas temperature rise condition is a case where an engine load exceeds a predetermined reference by checking whether the engine load rises.

17. The method of claim 16, further comprising confirming whether the EGR effective flow at the EGR valve 100% position is less than a No Flow Threshold, wherein, if the EGR effective flow at the EGR valve 100% position is less than the No Flow Threshold, the EGR effective flow is diagnosed as EGR clogging.

18. The method of claim 16, further comprising confirming whether the EGR effective flow at the EGR valve 0% position exceeds a Max Flow Threshold, wherein, if the EGR effective flow at the EGR valve 0% position exceeds the Max Flow Threshold, the EGR effective flow is diagnosed as EGR opening.

* * * * *